(12) United States Patent
Hirano et al.

(10) Patent No.: US 7,012,777 B1
(45) Date of Patent: Mar. 14, 2006

(54) DISK DRIVE WITH CAPACITANCE SENSING OF DISK VIBRATION AND FEEDFORWARD CONTROL FOR REMOVAL OF READ/WRITE HEAD TRACK MISREGISTRATION

(75) Inventors: Toshiki Hirano, San Jose, CA (US); Tetsuo Semba, San Jose, CA (US); Matthew T. White, Mountain View, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 0 days.

(21) Appl. No.: 10/956,908

(22) Filed: Sep. 30, 2004

(51) Int. Cl.
*G11B 5/596* (2006.01)

(52) U.S. Cl. .............................. 360/77.03; 360/77.04; 360/78.11

(58) Field of Classification Search .................... None
See application file for complete search history.

(56) References Cited

U.S. PATENT DOCUMENTS

| 6,339,512 | B1 * | 1/2002 | Sri-Jayantha et al. ..... 360/77.04 |
| 2002/0097517 | A1 * | 7/2002 | Bonin et al. ................... 360/75 |
| 2003/0072103 | A1 | 4/2003 | Kang et al. |
| 2003/0133218 | A1 * | 7/2003 | Guo et al. ..................... 360/75 |

* cited by examiner

*Primary Examiner*—Andrew L. Sniezek
(74) *Attorney, Agent, or Firm*—Thomas R. Berthold

(57) ABSTRACT

A data recording disk drive has a plurality of capacitive sensors, each sensor facing a surface of an associated disk, a capacitance sensing circuit for converting the sensed capacitance to a voltage representative of the distance between the sensor and the disk surface, and a feedforward controller that receives the voltage signal. The feedforward controller has a transfer function with gain and phase characteristics designed to match the transfer function from the out-of-plane disk vibration to the position of the read/write head while accounting for the effects of the sensor dynamics and the dynamics of the actuator. The output from the feedforward controller is combined with the output from the disk drive's servo feedback controller so that the effects of disk vibration on track misregistration of the head are removed from the control signal to the actuator.

18 Claims, 9 Drawing Sheets

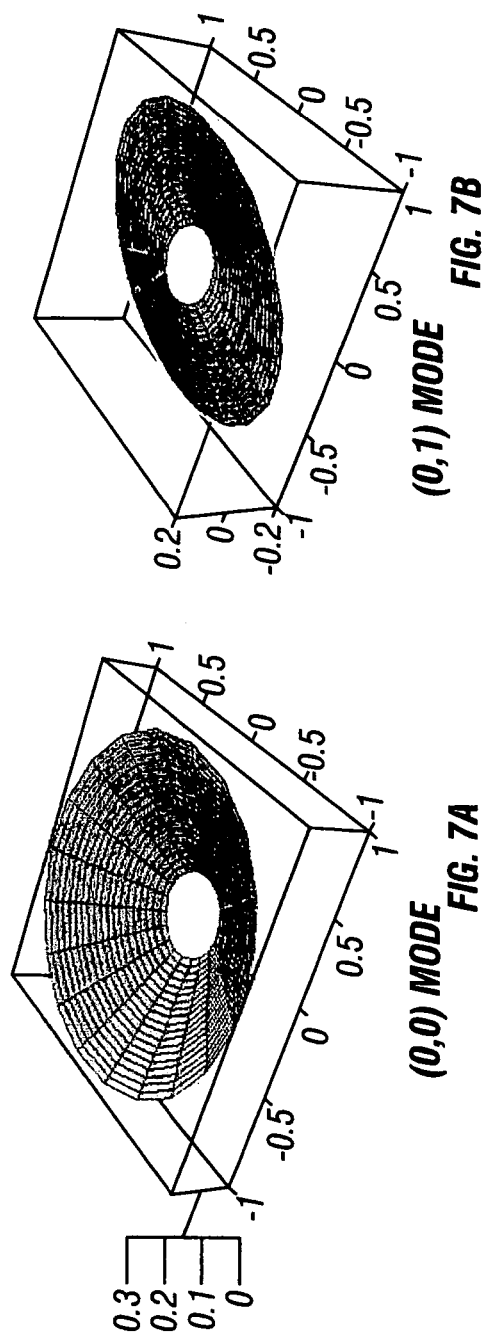
FIG. 7A (0,0) MODE
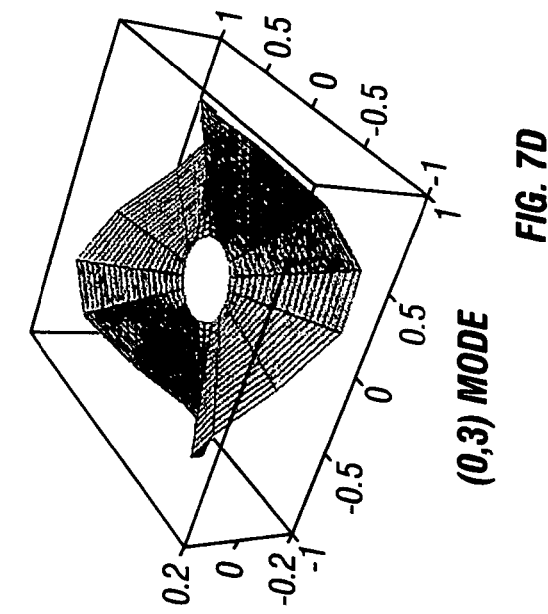
FIG. 7B (0,1) MODE
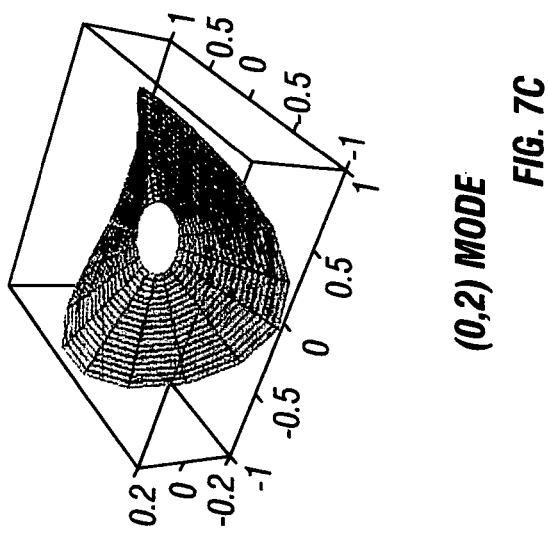
FIG. 7C (0,2) MODE
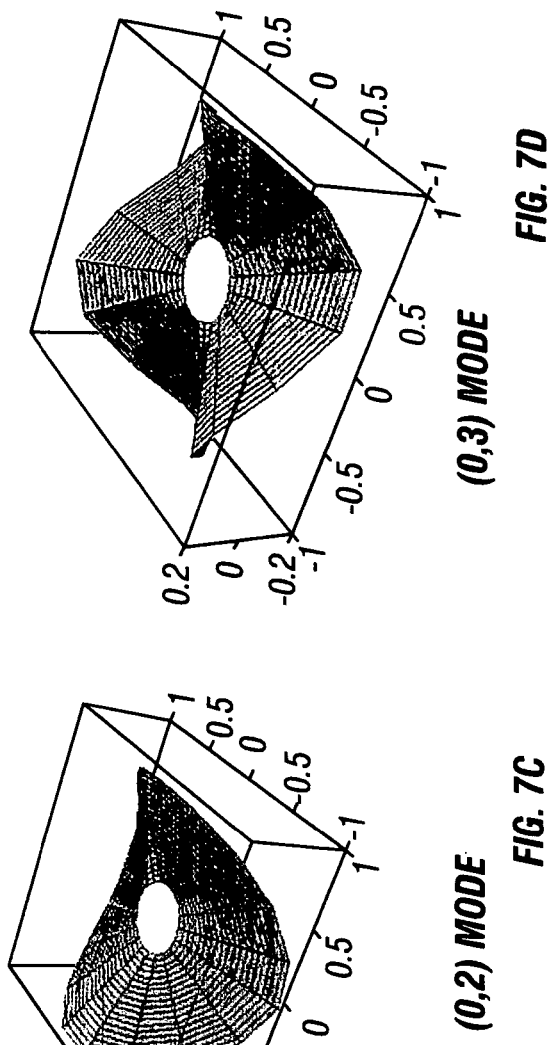
FIG. 7D (0,3) MODE OFF - TRACK ~ =h*θ

# DISK DRIVE WITH CAPACITANCE SENSING OF DISK VIBRATION AND FEEDFORWARD CONTROL FOR REMOVAL OF READ/WRITE HEAD TRACK MISREGISTRATION

BACKGROUND OF THE INVENTION

1. Field of the Invention

This invention relates generally to data recording disk drives, such as magnetic recording hard disk drives, and more specifically to such disk drives that experience out-of-plane disk vibration induced by air flow during rotation of the disks.

2. Background of the Invention

Data recording disk drives have a stack of recording disks rotated by a spindle motor, and an actuator that moves the read/write heads across the surfaces of the rotating disks. Each read/write head is formed on an air-bearing slider attached to one end of a flexible suspension. The suspension is attached at its other end to a relatively rigid arm of the actuator and allows the slider to pitch and roll on a bearing of air generated by the rotating disk. The disk drive actuator is typically a rotary voice coil motor (VCM) that moves the actuator arm and the attached suspension and slider generally radially to position the head at the desired track under the control of a servo control system that receives prerecorded servo position information from the disk. The trend in future disk drives is a continual decrease in the spacing of the concentric data tracks on the disk to increase the data storage density, and a continual increase in the rotational speed of the disk stack to decrease the data transfer time. As storage densities and rotational speeds increase, the ability to position the read/write heads to the proper data tracks and maintain the heads on the data tracks becomes more difficult. As disk-stack rotational speed increases, air-flow turbulence near the perimeter of the disks increases, which causes out-of-plane buffeting or vibration of the disks (sometimes misleadingly called disk "flutter"). These vibrations cause track-misregistration (TMR) of the read/write heads and thus errors in reading data from and writing data to the data tracks.

To address the problem of TMR caused by air-flow-induced disk vibration, thicker disks have been proposed, because disk vibration amplitude reduces as the thickness of the disk increases. However, there is limit on the maximum disk thickness due to the total height limitation of the disk drive. Shrouds located around the disk stack have also been proposed to reduce the effect of air flow turbulence on the disks, but have been shown to reduce disk vibration amplitude by only about 25% or less. Disk vibration damping plates have also been proposed, as described in published U.S. Patent Application U.S. 2003/0072103 A1. The damping plates have planar surfaces parallel to the planar surfaces of the disks and extend between the disks near their perimeter to encourage laminar air flow and thus a reduction in air flow turbulence. However, the damping plates also cause high viscous shear forces on the disks, which require a higher spindle-motor torque, and thus higher power consumption, to maintain the desired high rotational speed.

What is needed is a disk drive with a substantial reduction in disk-vibration-induced TMR of the read/write heads.

SUMMARY OF THE INVENTION

The invention is a data recording disk drive that addresses the problem of disk-vibration-induced TMR. The disk drive has a plurality of capacitive sensors, each sensor facing a surface of an associated disk, a capacitance sensing circuit for converting the sensed capacitance to a voltage representative of the distance between the sensor and the disk surface, and a feedforward controller that receives the voltage signal. The feedforward controller has a transfer function with gain and phase characteristics designed to match the transfer function from the out-of-plane disk vibration to the position of the read/write head while accounting for the effects of the sensor dynamics and the dynamics of the actuator. The output from the feedforward controller is combined with the output from the disk drive's servo feedback controller so that the effects of disk vibration on the head TMR are removed from the control signal to the actuator.

The vibration of the disk typically includes vibration that is caused by tilt of the disk relative to the axis of rotation and "warpage" of the disk, both of which are "repeatable" in that the axial displacement due to these effects is synchronous with disk rotation. This "repeatable runout" (RRO) component is subtracted out from the signal representative of the distance between the sensor and the disk surface. After the RRO component has been removed, the input to the feedforward controller is representative of the distance between the capacitive sensor and the disk surface due substantially only to non-repeatable runout (NRRO) disk disturbance forces.

The feedforward controller is designed from modeled disk mode shapes and known resonant frequencies because the out-of-plane vibration of the disk at its resonant frequencies is the primary contribution to TMR. A finite-element model (FEM) of the disk is used to generate a mode shape for each resonant vibration mode of interest, and the disk mode shapes are then fit to a polynomial to represent the out-of-plane displacement of the disk as function of radial location. From this function and the measured sensor values, the gain and phase characteristics of the feed forward controller are calculated. Because the desired feedforward controller may vary slightly in gain and phase across the radius of the disk, the feedforward controller may change the gain and/or phase according to the radial head location on the disk.

For a fuller understanding of the nature and advantages of the present invention, reference should be made to the following detailed description taken together with the accompanying figures.

BRIEF DESCRIPTION OF THE DRAWINGS

FIGS. 7A–7D are representations of the first four resonant vibration mode shapes for a typical disk generated by a finite-element-model (FEM) of the disk.

DETAILED DESCRIPTION OF THE INVENTION

Figure 1:
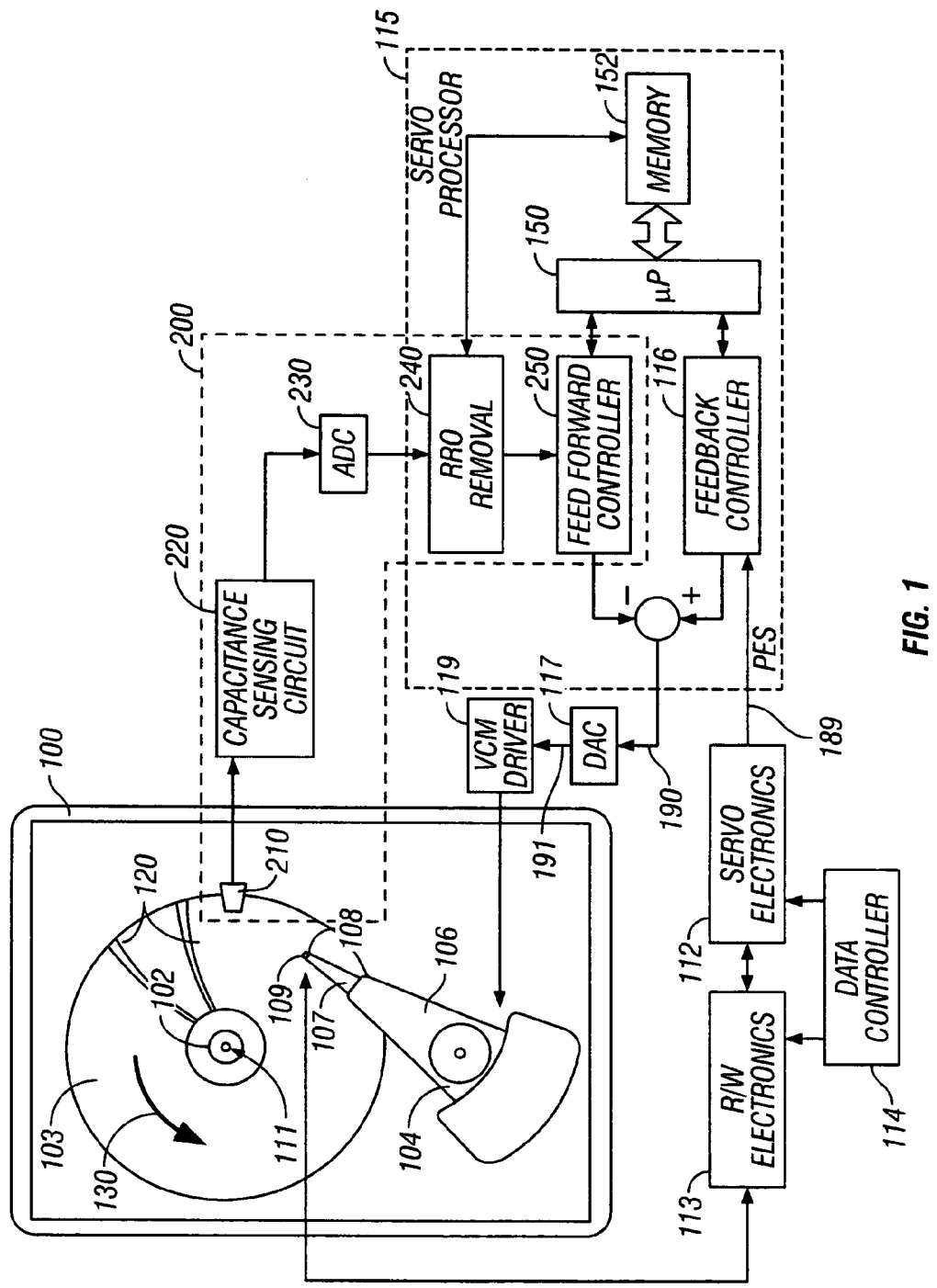
FIG. 1 is a block diagram of a conventional magnetic recording disk drive incorporating the present invention, with the invention being identified as block 200 for ease of explanation.

FIG. 1 is a block diagram of a conventional magnetic recording disk drive incorporating the present invention, with the invention being identified as block 200 for ease of explanation. The conventional disk drive includes a housing 100 that supports a spindle motor 102 and a voice-coil-motor (VCM) actuator 104. At least one magnetic recording disk 103 is mounted on and rotatable by the spindle motor 102. A read/write head 109 reads and/or writes data in the magnetic recording layer of the disk 103.

The recording head 109 may be an inductive read/write head or a combination of an inductive write head with a magnetoresistive read head and is located on the trailing end of slider 108. Slider 108 is supported on the actuator arm 106 by a suspension 107 that enables the slider to "pitch" and "roll" on an air-bearing generated by the rotating disk 103. Typically, there are multiple disks stacked on a hub that is rotated by the spindle motor 102, with a separate slider and recording head associated with each surface of each disk.

Data recording disk 103 has a center of rotation about axis 111 and is rotated in direction 130. Disk 103 includes radially-spaced concentric data tracks. The head must be maintained substantially on the centerline of a data track to correctly read and write data. However, during operation of the disk drive the head experiences track misregistration (TMR) from various disturbance forces. Thus, each data track has a plurality of circumferentially or angularly-spaced servo sectors that contain head positioning information detectable by the head and used in a servo feedback control system to maintain the head on the centerline of the desired data track. The servo sectors in each track are aligned circumferentially with the servo sectors in the other tracks so that they extend across the tracks in a generally radial direction, as represented by two typical servo sectors 120. The data to be written by the head 109 is passed from data controller 114 to the read/write (R/W) electronics 113, and data read by the head is passed from the R/W electronics 113 back to data controller 114. The data controller 114 also provides information to servo electronics 112 for identifying the head number and the track number and data sector number where data is being written or read.

Figure 2:
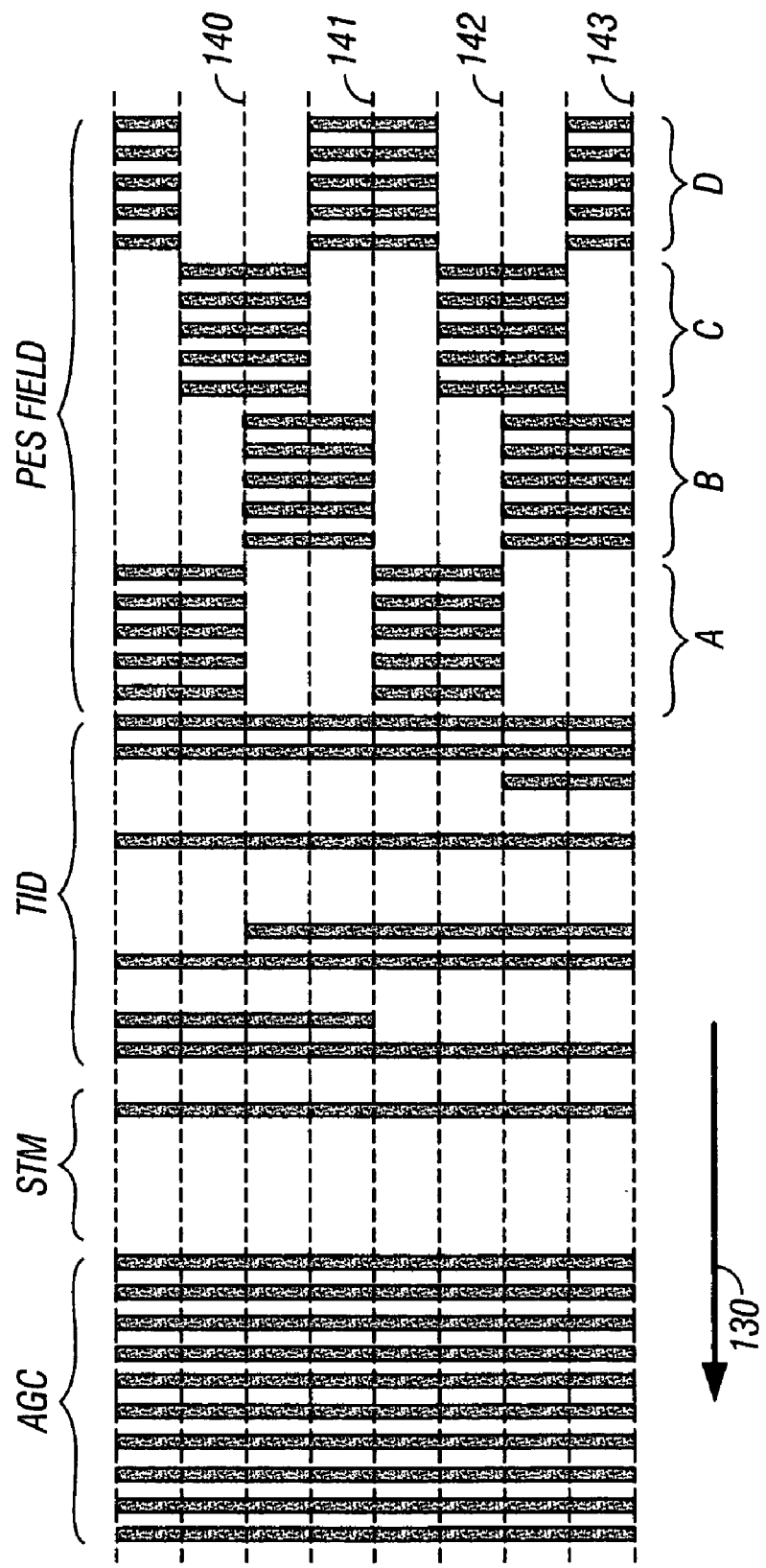
FIG. 2 is a schematic of a conventional servo pattern of the type commonly used in disk drives with sector servo and shows a greatly simplified pattern for clarity with several tracks in one of the servo sectors.

FIG. 2 is a schematic of a conventional servo pattern of the type commonly used in sector servo systems and shows a greatly simplified pattern for clarity with several tracks in one of the servo sectors 120. The servo pattern moves relative to head 109 in the direction shown by arrow 130. The two possible magnetic states of the medium are indicated as black and white regions. The servo pattern is comprised of four distinct fields: an automatic gain control (AGC) field, a servo-timing-mark (STM) field, a track ID (TID) field and a position-error-signal (PES) field depicted as the well-known quad-burst pattern of bursts A–D. The AGC field allows for calibration of the timing and gain parameters for later fields, the servo timing mark STM field serves as a timing reference for reading the subsequent servo information in the TID field and the PES field, and the TID field contains the data track number.

The position error signal (PES) field contains PES bursts A–D that are used to determine the fractional part of the radial position of the head. Each PES burst comprises a series of regularly spaced magnetic transitions. The PES bursts are arranged radially such that a burst of transitions are one track wide and two tracks apart, from centerline to centerline, as shown by centerlines 140, 141, 142, 143. The A and B bursts are the main bursts because when the head is at the track centers the read-back signal amplitudes from A and B are equal. When the head is at the half-track positions the amplitudes from C and D are equal. The PES bursts are offset from their neighbors such that when the head is centered over an even-numbered track (e.g., track with centerline 142) the read-back signal from bursts A and B are equal. As the head moves off-track, the read-back signals from the different bursts increase or decrease and can be decoded to detect the off-track position of the head. While a conventional quad-burst pattern is described, the invention is fully applicable to disk drives that use other servo patterns.

The servo information in the pattern of FIG. 2 is read by the R/W electronics 113 (FIG. 1), and signals are input to the servo electronics 112. The servo electronics 112 decodes the read-back servo signals and provides a digital PES 189 to the servo control processor 115. The servo control processor 115 provides a head position control signal 190 to digital-to-analog converter (DAC) 117 that sends an analog actuator control signal 191 to VCM driver 119 to move the VCM actuator 104 so that the head 109 remains on the track centerline.

The servo control processor 115 includes a microprocessor 150 that uses the PES 189 as input to a control algorithm to generate the head position control signal 190. The control algorithm is a feedback controller 116, which is a set of parameters based on the static and dynamic characteristics of the "plant" being controlled, i.e., the VCM 104. The control algorithm is essentially a matrix multiplication algorithm, and the parameters are coefficients used in the multiplication and stored in memory 152 accessible by the microprocessor 150.

Figure 3:
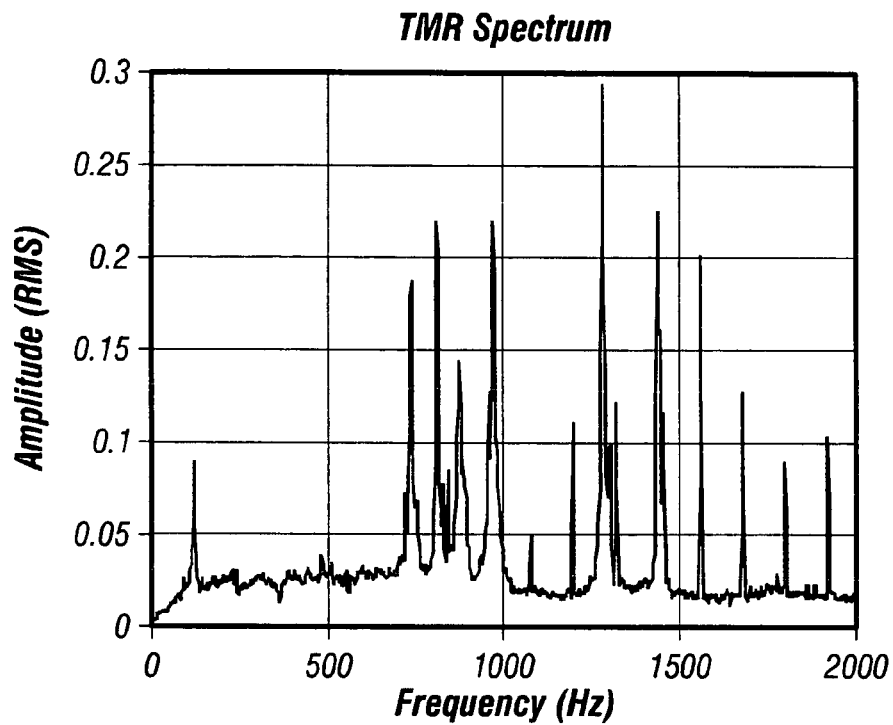
FIG. 3 shows a typical frequency spectrum of track misregistration (TMR) of the read/write head including TMR caused by vibration of the disk at its resonant frequencies.

Out-of-plane or axial disk vibration (sometimes misleadingly referred to as "flutter") is a major source of track-misregistration (TMR) of the read/write head. FIG. 3 shows a typical frequency spectrum of TMR amplitude. The large spikes between 700 and 1500 Hz are due to track error caused by axial disk vibration. For a typical disk drive with 95 mm diameter disks, disk flutter is responsible for approximately 30% of the total TMR. The conventional servo feedback controller can not always correct for head position error caused by disk flutter because the frequency range is too high.

Figure 4:
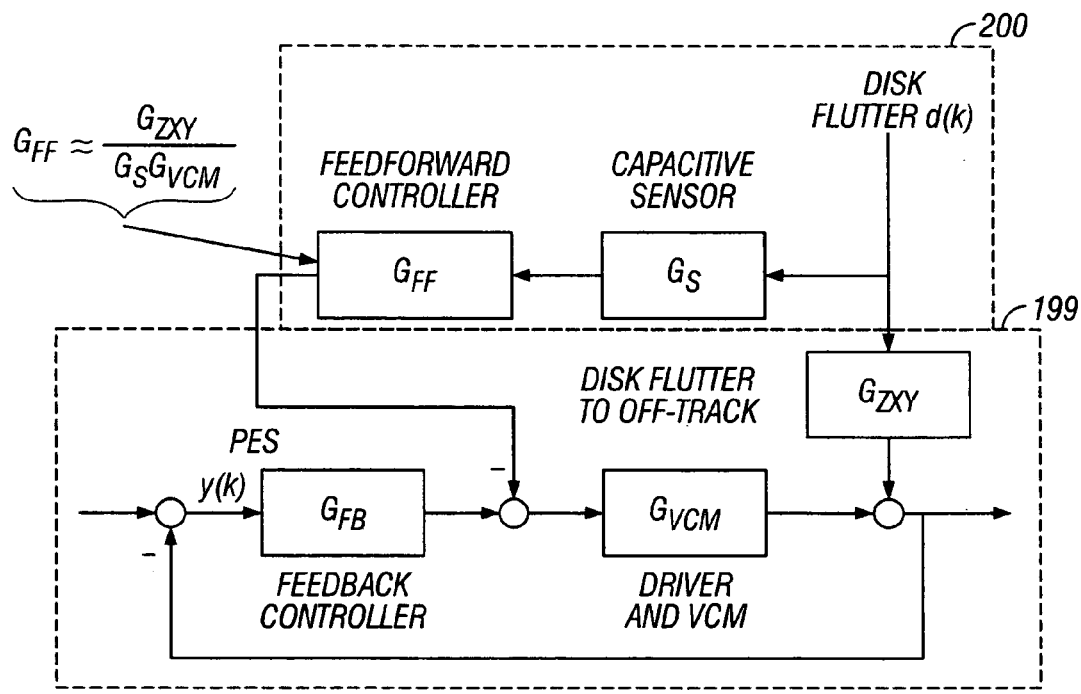
FIG. 4 is a control system diagram of the servo feedback controller loop of the conventional disk drive incorporated with the feedforward controller loop of the present invention.

The present invention addresses the problem of disk-flutter-induced TMR. FIG. 4 is a control system diagram of the feedback controller loop 199 of the conventional disk drive with the feedforward controller loop 200 of the present invention. $G_{ZXY}$ is the transfer function from the external disturbance d(k) of disk flutter to the position of the head. The feedforward controller 200 has a transfer function $G_{FF}$ designed to match this transfer function while accounting for the effects of the sensor dynamics ($G_S$) and the dynamics of the VCM driver and the VCM ($G_{VCM}$). The output from the feedforward controller 200 is combined with the output from the feedback controller 199.

The present invention is generally depicted as block 200 in FIG. 1. The invention includes a capacitive sensor 210 that faces the surface of disk 103, a capacitance sensing circuit 220, an analog-to-digital converter (ADC) 230, means 240 for removal of the disk vibration component that is synchronous with disk rotation, also called repeatable runout (RRO), and a feedforward controller 250.

As shown in FIG. 1, the exemplary capacitive sensor 210 has a generally trapezoidal shape and is located near the slider 108 but outside the outer extent of the generally radial path of the slider 108. The capacitive sensor 210 can be a commercially available capacitance probe, such as Model Series 5000 available from ADE Technologies. However, to reduce cost the capacitive sensor 210 can be a metal plate with a surface area designed so that it is large enough to provide a capacitive signal but small enough so that it is detecting substantially only "local" axial displacement of the disk, i.e., displacement near the slider 108.

Figure 5:
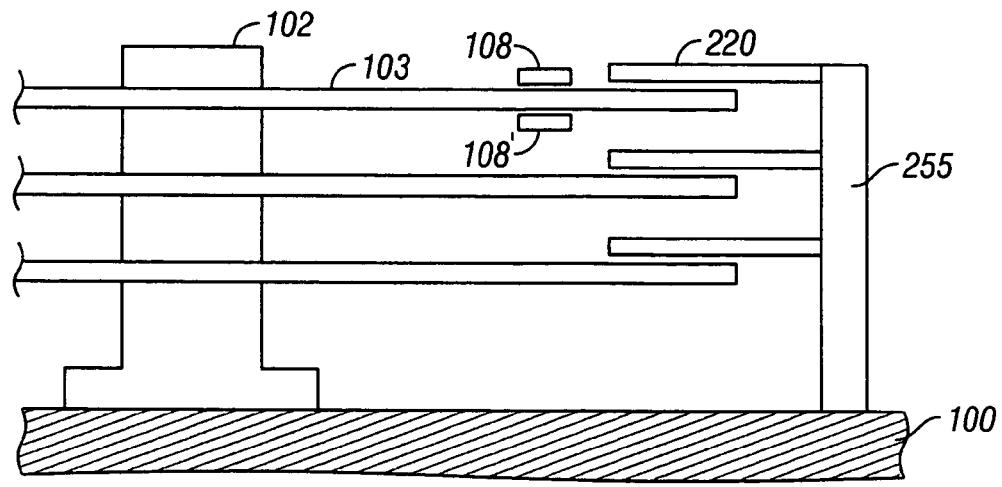
FIG. 5 is a side view showing the spindle motor mounted to disk drive housing and supporting a plurality of disks and the capacitive sensors associated with the disks.

FIG. 5 is a side view showing the spindle motor 102 mounted to disk drive housing 100 and supporting a plurality of disks, including disk 103 (three disks are shown in FIG. 5). A capacitive sensor is associated with each disk such as sensor 210 facing the top surface of disk 103. The spacing between the sensor 210 and the top surface of disk 103 is in the range of about 0.1 mm to 0.4 mm, a spacing selected to be close enough for adequate sensor sensitivity yet far enough to avoid contact between the sensor and the disk during an external shock to the disk drive. The sensors are attached to a support post 255 that is mounted to the housing 100. Concurrently filed application Ser. No. 10/956, 919, filed Sep. 30, 2004 and titled "DISK DRIVE WITH SUPPORT STRUCTURE FOR DISK-VIBRATION CAPACITIVE SENSORS" describes more detailed support structures for the capacitive sensors.

During rotation of the spindle motor 102, the disks will experience vibration, typically caused by airflow disturbances, which will cause TMR of the head supported on slider 108 on the top surface of disk 103, as well as on head 108' on the bottom surface of disk 103. During vibration of the disk the distance between the sensor and the disk surface, such as between sensor 210 and the top surface of disk 103, will change and be detected as a change in capacitance. The capacitance is inversely proportional to the gap or distance between the sensor and the disk surface by the relationship $C=(\epsilon A)/g$, where $\epsilon$ is the permittivity, A is the area of the sensor plate and g is the gap. Thus, if the capacitance change $\Delta C$ of sensor 210 from a reference value established when the disk drive is not operating is negative, then the gap between sensor 210 and the top surface of disk 103 has increased by some value $\Delta g$, indicating that the top surface of disk 103 has tilted so as to have a "convex" shape. Also, this indicates that the bottom surface of disk 103 on which slider 108' is located has tilted so as to have a "concave" shape. Thus when the capacitive sensor signal is being used in the feedforward control of the head located on the surface of the disk opposite to the disk surface faced by the sensor, the signal polarity needs to be switched. Of course, two capacitive sensors could be used for each disk, with a sensor for each of the two disk surfaces. Two capacitive sensors could also be used for each disk such that both sensor signals are used differentially for each of the two disk surfaces.

Figure 6:
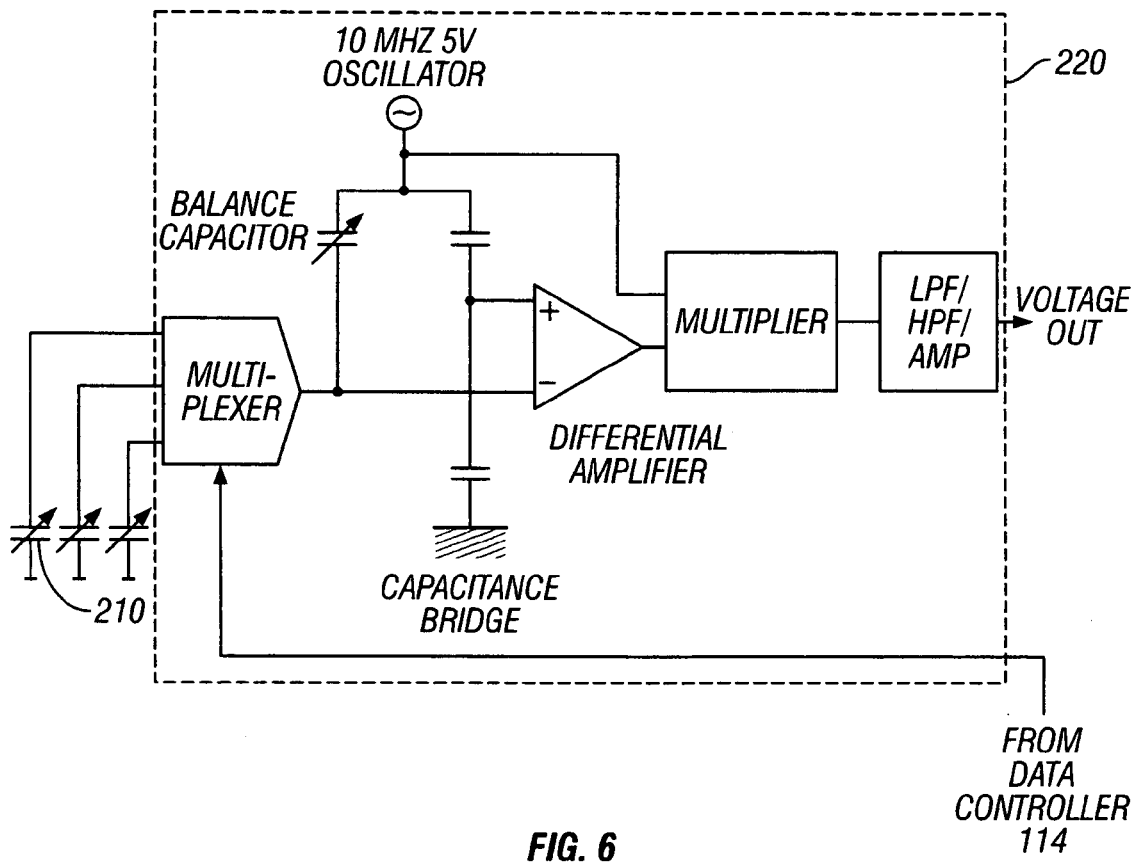
FIG. 6 is a schematic of a conventional capacitance sensing circuit.

FIG. 6 is a schematic of an exemplary capacitance sensing circuit 220. The outputs of three capacitive sensors, including sensor 210, are input to a multiplexer. The disk drive controller 114 (FIG. 1), which has selected the head that is reading or writing, provides a signal to the multiplexer so that the sensor associated with the disk on which the selected head is reading or writing is selected as the input to the sensing circuit 220. The circuit is operated at 10 MHz and the signal from the selected sensor is input to a capacitance bridge. Signals outside the range of interest are removed by a high pass filter (HPF) and a low pass filter (LPF), and the signal is amplified and output as a voltage. The voltage signal out of circuit 220 represents the gap or distance between the selected sensor and its associated disk surface.

Referring again to FIG. 1, the signal from capacitance sensing circuit 220 is converted to digital by ADC 230. The RRO removal means 240 and feedforward controller 250 are shown as incorporated in servo processor 115. In the preferred embodiment these functions are performed in software as part of algorithms run by the microprocessor 150. The capacitive sensor signal usually has relatively large RRO because the vibration of the disk includes vibration that is caused by tilt of the disk relative to the axis of rotation and "warpage" of the disk, both of which are "repeatable" in that the axial displacement due to these effects is synchronous with disk rotation. Thus each digital value output by ADC 230 includes a RRO component that can be subtracted out. After the RRO component has been removed, the digital value input to the feedforward controller 250 is representative of the distance between the capacitive sensor and the disk surface due substantially only to non-repeatable disk disturbance forces.

The RRO removal algorithm may be a "subtraction-type" algorithm that calculates the RRO over a number of disk revolutions and then subtracts the computed RRO component. The capacitive sensor signal can be measured at a discrete number of angular locations on the disk, e.g., at each servo sector, and the average values computed. The averaged values are then stored in memory 152 as a table of servo sector numbers and associated RRO component values. The microprocessor 150 then recalls the appropriate RRO component value and subtracts it from the sensor digital value prior to operating the feedforward controller algorithm. The averages can also be calculated in real-time as a moving average, with or without memory.

The feedforward controller 250 is a frequency-response-matching controller that substantially matches the frequency response of disk flutter to TMR, while accounting for the effects of the sensor dynamics and the dynamics of the VCM driver and the VCM. The feedforward controller 250 output has opposite sign of the disturbance effects, as shown in FIG. 1.

Figure 8:
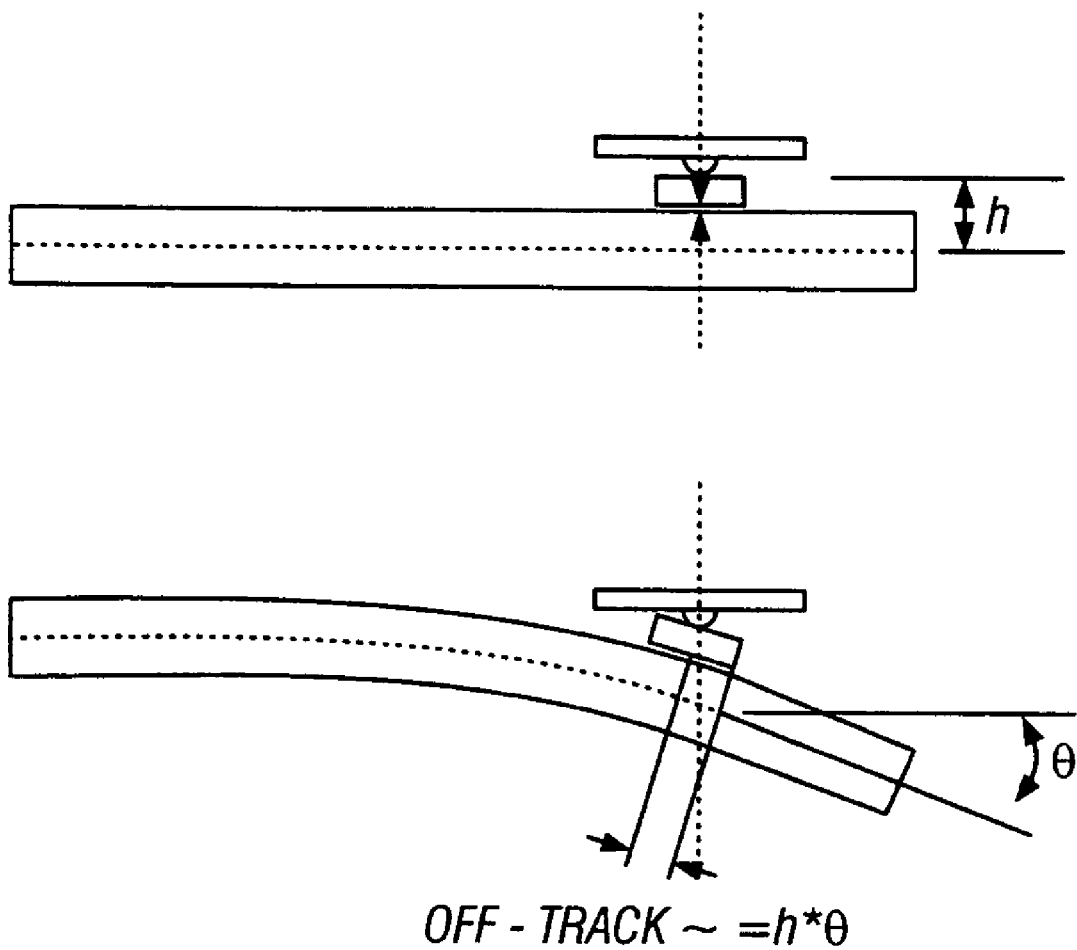
FIG. 8 is a schematic illustrating off-track position of the slider related to the product of the tilt angle Θ(r) and the distance h from the slider pivot point to the center of the disk's thickness.
Figure 9:
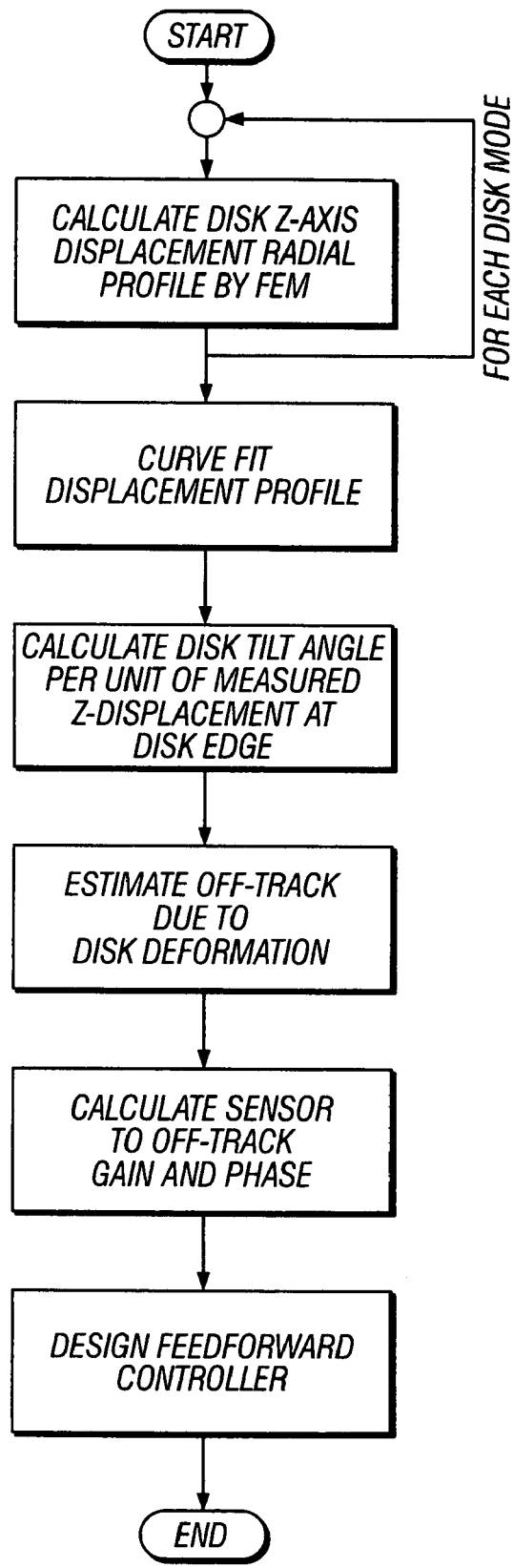
FIG. 9 is a flow chart that shows one possible way to determine the effects of the disk motion on the TMR and design an appropriate feedforward controller.

The method for designing the feedforward controller 250 will be explained with reference to FIGS. 7–9. The vibration of the disk at its resonant frequencies during operation of the disk drive contributes to TMR. FIGS. 7A–7D are computer generated representations of the first four resonant mode shapes for a typical disk. The TMR occurs primarily when the z-axis motion of the disk, i.e., the axial or out-of-plane motion, results in tilting of the disk surface, which in turn affects the position of the slider relative to the data track. FIG. 8 is a schematic illustrating off-track position of the slider related to the product of the tilt angle $\Theta(r)$ and the distance h from the slider pivot point to the center of the disk's thickness. To compensate for these effects, the disk mode shapes and resonant frequencies must be considered when designing the feedforward controller. One possible way to determine these effects and generate an appropriate feedforward controller is described in the following paragraphs and summarized in the flow chart of FIG. 9.

First, a finite-element model (FEM) of the disk is generated using the known material properties and geometry of the disk. For each mode of interest, a mode shape is generated from the FEM at the circumferential location of the capacitive sensor. Then the radial disk mode shape is fit to a polynomial to represent the z-axis displacement of the disk as function of the radial location z(r). Then the tilt angle $\Theta(r)$ is calculated at each radial location as the derivative of the z-axis motion with respect to the radius according to the relationship $$\Theta(r)=dz(r)/dr.$$

Let $\Delta z_{calc}$ be the z-axis disk displacement at the location of the capacitive sensor as calculated by the FEM. Then the normalized disk tilt angle is calculated as $$\Theta_{norm}(r)=(r)/\Delta z_{calc}.$$

The off-track motion $\Delta x(r)$ at each radial location due to the disk mode is then approximated by the product of the tilt angle $\Theta(r)$ and the distance h from the slider pivot point to the center of the disk's thickness as $$\Delta x(r)=h\Theta(r).$$

This is calculated from the measured sensor signal $\Delta z_{meas}$ as $$\Delta x(r)=h\Theta_{norm}(r)\Delta z_{meas}.$$

The magnitude of the transfer function from the sensor to the TMR at the disk mode frequency is then calculated as $$M(r)=\Delta x(r)/\Delta z_{meas}.$$

Let $\phi$ be the angle between the center of the capacitive sensor and the location of the read/write head. Let i be the mode number, i.e. the number of nodal diameters of the mode, where the mode number is positive for forward-traveling modes and negative for backward-traveling modes. Then the phase of the transfer function from the sensor to the TMR at the disk mode frequency is calculated as $$\Phi(r)=i\phi.$$

Next, the feedforward controller magnitude and phase is calculated for each mode resonant frequency as described above. Weighting of each mode may be performed using such criteria as the magnitude of the TMR at each mode resonant frequency. A realizable filter is synthesized to best fit the desired feedforward controller magnitude and phase, using a technique such as least-squares.

The desired feedforward controller magnitude and phase can also be determined through measurements of the hard disk drive and then synthesized using standard controller synthesis techniques. Synthesizing such frequency responses often involves approximations to deal with unstable zeros that cannot be inverted. Additional frequency response synthesis techniques are available to deal with this issue.

Figure 10:
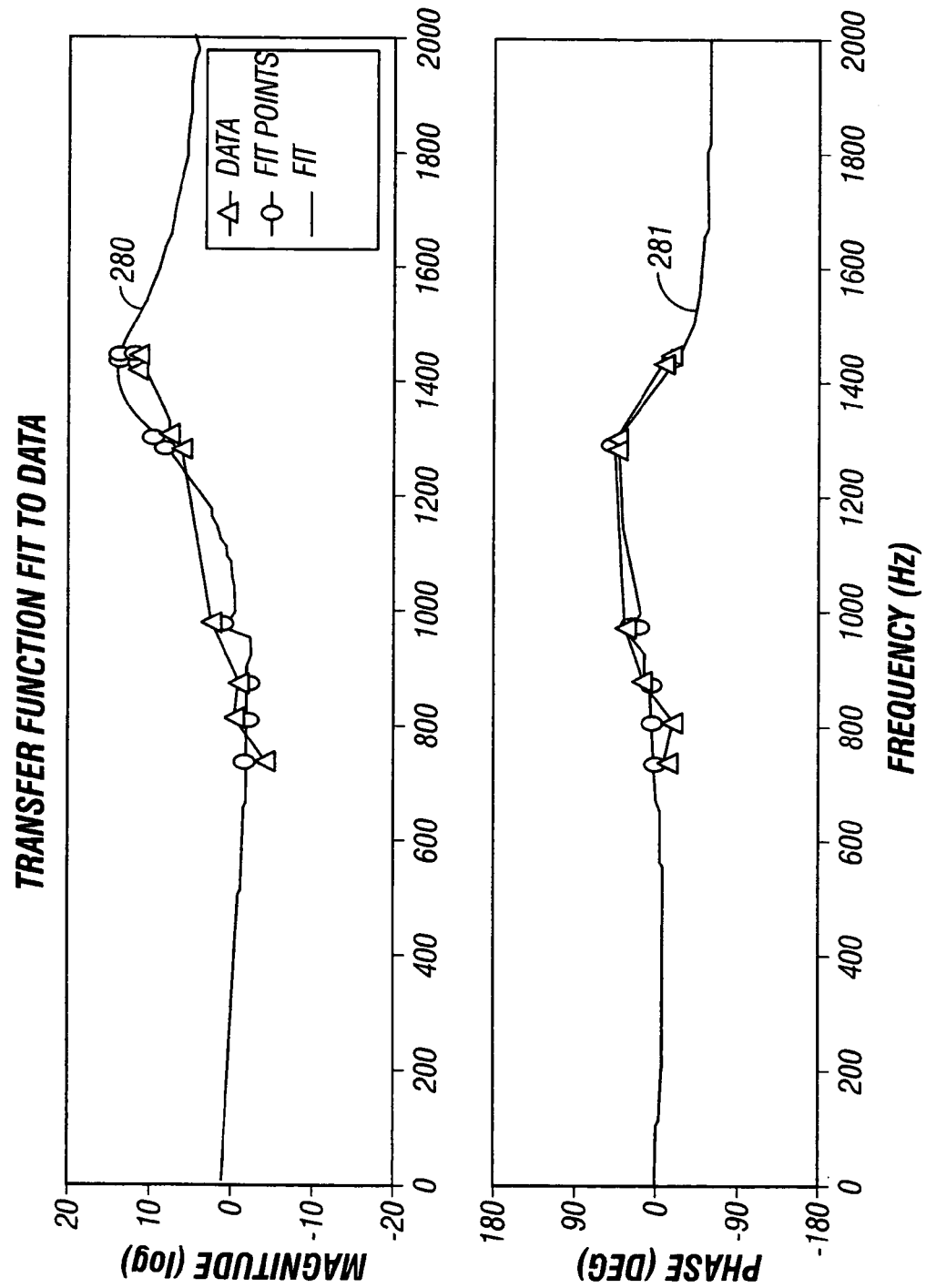
FIG. 10 shows the gain and phase characteristics for the desired feedforward controller based on actual measured data at the disk resonant frequencies.

FIG. 10 shows the gain 280 and phase 281 characteristics for the desired feedforward controller based on actual measured data at the disk resonant frequencies (triangles). The solid lines 280, 281 represent the fit to that data. It is important to match the gain and phase of the desired frequency response to achieve maximum reduction of the disk flutter effects. Because the desired feedforward controller may vary slightly in gain and phase across the radius of the disk, the feedforward controller may change the gain and/or phase according to the radial head location on the disk. The gain needs to be higher when the head is at the outer-diameter location than when the head is at the inner-diameter location. Experimental measurements have shown that the gain should increase generally linearly with disk radius. The gain and phase can be selected from a table stored in memory 152 (FIG. 1) of gain and phase values and associated disk radial locations or annular disk zones, with the radial location of the head being available from the TID provided to the servo processor 115 by servo electronics 112 (FIG. 1).

Figure 11:
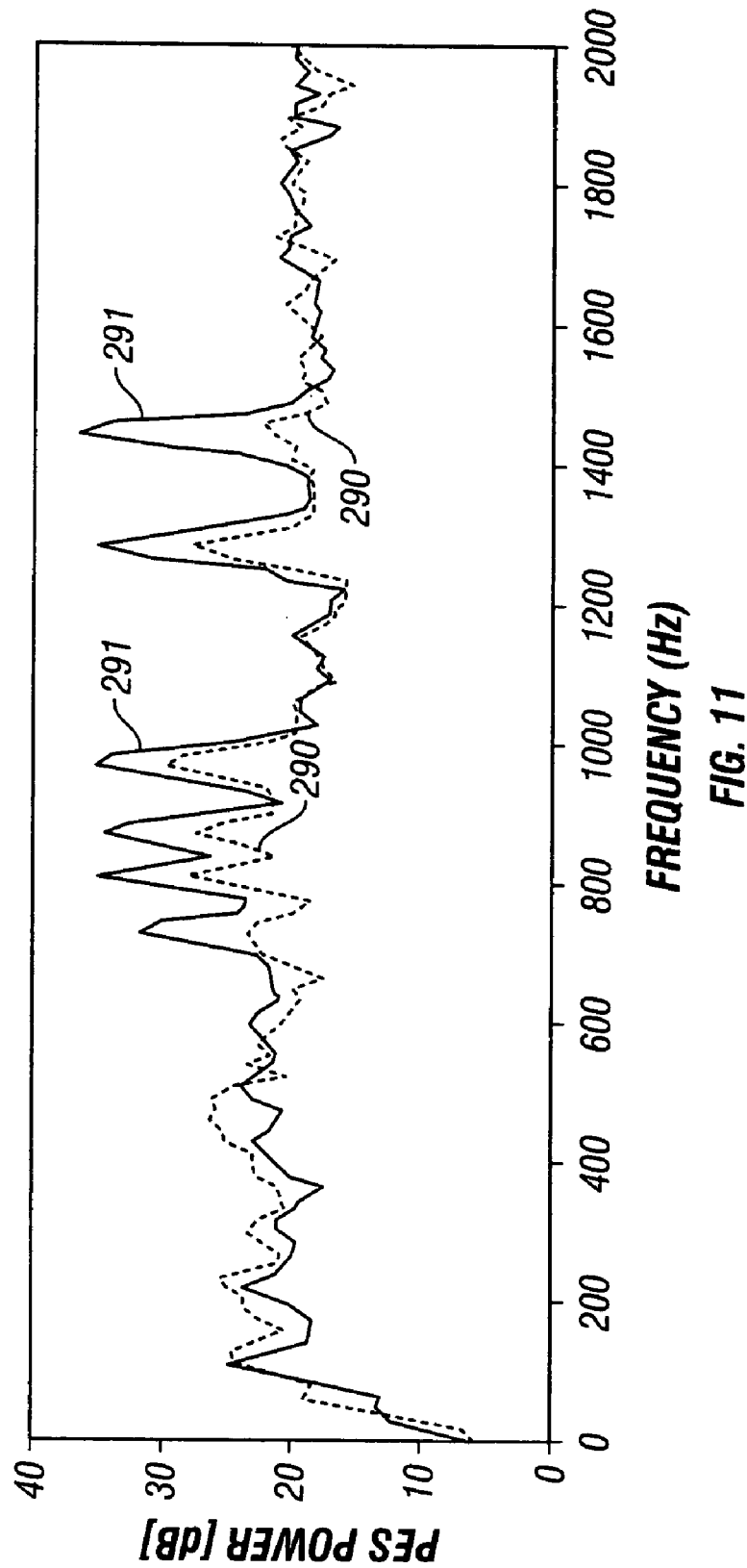
FIG. 11 shows the PES power spectrum in the frequency range of interest with and without the feedforward control of the present invention.

FIG. 11 shows an example of the effectiveness of the invention. FIG. 11 shows the PES power spectrum in the frequency range of interest with (line 290) and without (line 291) the feedforward control. The PES power spectrum with feedforward control is significantly lower than the spectrum without feedforward control at the disk flutter frequencies. The feedforward control reduced the non-repeatable runout (NRRO) by approximately 26%.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A disk drive having a rotatable magnetic recording disk with a plurality of data tracks and a recording head movable across the disk surface for reading and/or writing data in the tracks, and wherein the tracks contain head position information detectable by the head and the head experiences a track misregistration (TMR) frequency response as a result of out-of-plane vibration of the rotating disk, the disk drive comprising:
   an actuator for moving the head across the disk surface;
   a head position feedback controller responsive to position information detected by the head for generating a head position control signal;
   a capacitive sensor facing the disk surface;
   a capacitance sensing circuit coupled to the sensor for generating a signal representative of the distance between the sensor and the disk surface; and
   a feedforward controller responsive to the distance signal for generating a correction signal, the correction signal being combined with the head position control signal to generate an actuator control signal, the feedforward controller having gain and phase characteristics to substantially match the frequency response from the out-of-plane vibration to the TMR while accounting for the effects of the dynamics of the capacitive sensor and actuator.

2. The disk drive of claim 1 wherein the feedforward controller gain is variable, the gain value being selected in response to radial position of the head on the disk surface.

3. The disk drive of claim 2 wherein the disk drive includes a head movable across the disk surface opposite the disk surface faced by the capacitive sensor, and wherein the polarity of the selected gain value is switchable in response to the head selected for reading or writing.

4. The disk drive of claim 1 wherein the feedforward controller phase is variable, the phase value being selected in response to radial position of the head on the disk surface.

5. A disk drive having a rotatable magnetic recording disk with a plurality of data tracks and a recording head movable across the disk surface for reading and/or writing data in the tracks, and wherein the tracks contain head position information detectable by the head, the disk drive comprising:
- an actuator for moving the head across the disk surface;
- a head position feedback controller responsive to position information detected by the head for generating a head position control signal;
- a capacitive sensor facing the disk surface;
- a capacitance sensing circuit coupled to the sensor for generating a signal representative of the distance between the sensor and the disk surface; and
- a feedforward controller responsive to the distance signal for generating a correction signal, the correction signal being combined with the head position control signal to generate an actuator control signal;
- wherein the distance between the sensor and the disk surface includes a component that is substantially repeatable for each angular location on the disk surface, and wherein the feedforward controller is responsive to the distance signal after removal of said component.

6. The disk drive of claim 5 further comprising a digital servo processor comprising the feedback controller and the feedforward controller, the processor combining the head position control signal and the correction signal and generating a digital actuator control signal.

7. The disk drive of claim 6 further comprising an analog-to-digital converter between the capacitance sensing circuit and the processor for converting the distance signal to a digital distance signal usable by the processor.

8. The disk drive of claim 7 wherein the processor subtracts said component from the digital distance signal.

9. The disk drive of claim 6 wherein the actuator is a voice coil motor (VCM) and further comprising a digital-to-analog converter for converting the digital actuator control signal to an analog actuator control signal to the VCM.

10. A magnetic recording disk drive comprising:
- a housing;
- a spindle motor attached to the housing;
- a magnetic recording disk having a plurality of generally concentric data tracks containing head position servo information, the disk being mounted to and rotatable by the spindle motor about an axis of rotation, the disk experiencing axial vibration during its rotation;
- a recording head for reading and writing data in the tracks, the head experiencing a trackmisregistration (TMR) frequency response as a result of axial vibration of the rotating disk;
- a voice coil motor (VCM) actuator for moving the head generally radially across the tracks and for maintaining the head on a desired track during reading and writing;
- servo electronics for converting servo information detected by the head to a digital position error signal (PES);
- a capacitive sensor attached to the housing and facing the disk surface;
- a capacitance sensing circuit coupled to the sensor for generating an analog signal representative of the distance between the sensor and the disk surface during axial vibration of the disk;
- an analog-to-digital converter for converting the analog distance signal to a digital distance value;
- a digital servo processor comprising a feedback controller for generating a head position control value from the PES and a feedforward controller having gain and phase characteristics to substantially match the TMR frequency response for generating a correction to the head position control value from the digital distance value, the processor outputting a corrected head position control value; and
- a digital-to-analog converter for converting the corrected head position control value to an analog actuator control signal to the VCM.

11. The disk drive of claim 10 wherein the feedforward controller gain is variable, the feedforward controller generating a correction to the head position control value using a gain value selected in response to radial position of the head on the disk surface.

12. The disk drive of claim 11 wherein the processor includes memory for storing digital values, and further comprising a table of head radial position values and associated gain values stored in the memory.

13. The disk drive of claim 10 wherein the feedforward controller phase is variable, the feedforward controller generating a correction to the head position control value using a phase value selected in response to radial position of the head on the disk surface.

14. The disk drive of claim 13 wherein the processor includes memory for storing digital values, and further comprising a table of head radial position values and associated phase values stored in the memory.

15. The disk drive of claim 10 wherein the processor includes memory for storing digital values, wherein the distance between the sensor and the disk surface includes a component that is substantially repeatable for each angular location on the disk surface, and further comprising a table of disk angular locations and associated distance component values stored in the memory, the processor modifying the digital distance value with a component value from the table prior to generation of the correction to the head position control value by the feedforward controller.

16. The disk drive of claim 10 further comprising a plurality of disks stacked on the spindle motor and a plurality of capacitive sensors, each sensor being associated with and facing a surface of an associated disk.

17. The disk drive of claim 16 wherein the capacitance sensing circuit includes a multiplexer for selecting one of said capacitive sensors.

18. The disk drive of claim 16 wherein the plurality of capacitive sensors comprises a sensor for each disk surface.

* * * * *